Patented Aug. 19, 1947

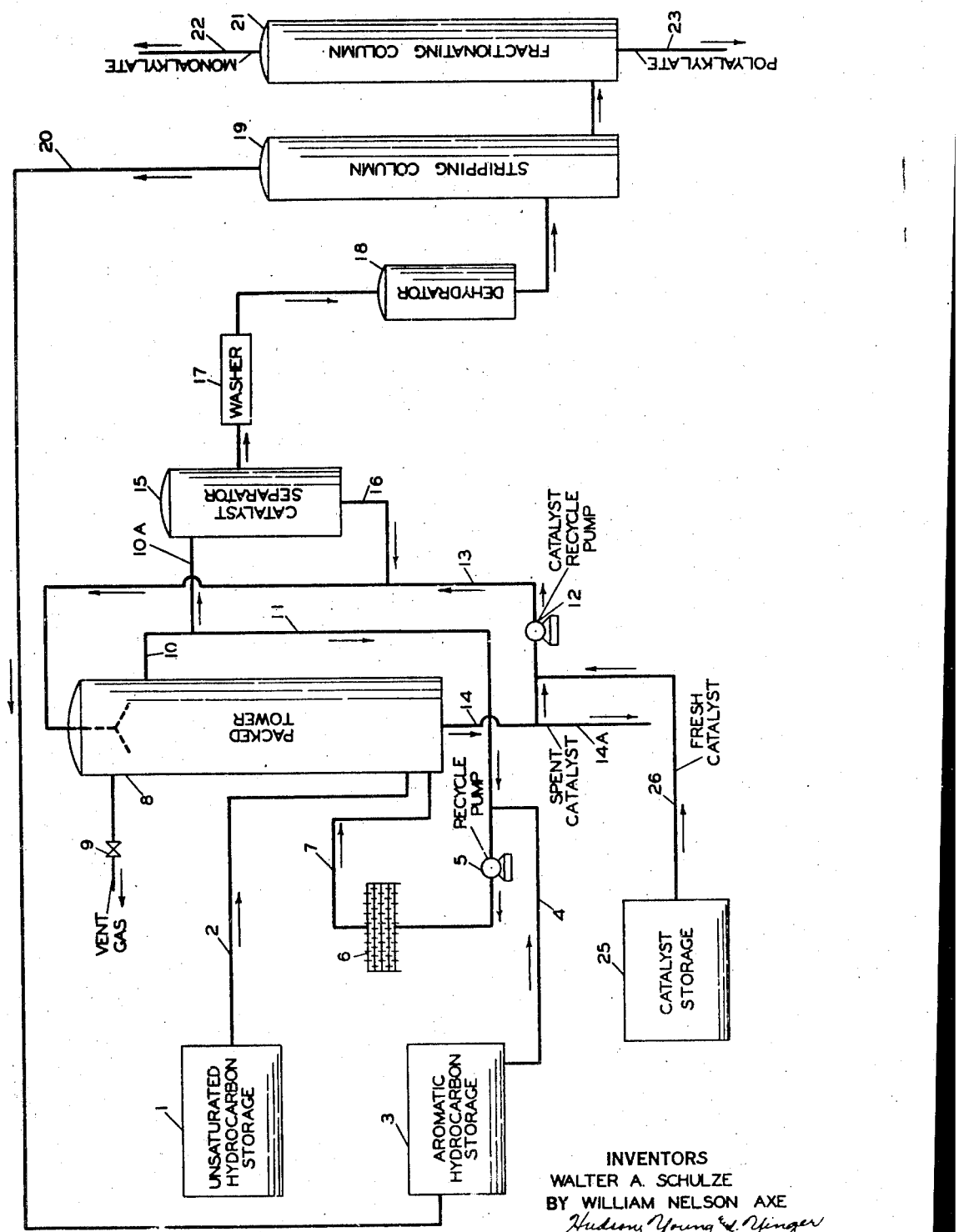

2,425,839

UNITED STATES PATENT OFFICE 2,425,839

CATALYTIC ALKYLATION OF AROMATIC HYDROCARBONS

Walter A. Schulze and William N. Axe, Bartlesville, Okla., assignors to Phillips Petroleum Company, a corporation of Delaware Application February 5, 1942, Serial No. 429,698

8 Claims. (Cl. 260—671)

The present invention relates to a new process for the alkylation of aromatic hydrocarbons with unsaturated aliphatic hydrocarbons, namely the mono-olefins, diolefins and cyclo-olefins, and more particularly to the use of a particular catalyst in such a process.

Except under extreme conditions of temperature and pressure, alkylation processes, in general, require the presence of catalyst to produce appreciable reaction rates. Classical alkylation procedures involved the action of alkyl halides on aromatic hydrocarbons in the presence of aluminum chloride and similar catalysts of the Friedel-Crafts type. In many instances it was found that alcohols could be used in place of the more expensive alkyl halides. Since all alkylation reactions take place under conditions favoring the formation of olefins from alcohols or alkyl halides, the present trend is toward the direct use of unsaturated hydrocarbons as the source of alkyl radicals.

The most frequently employed catalysts are: aluminum chloride, ferric chloride, zinc chloride and sulfuric acid. The alkyl radicals in whatever form they may be employed may undergo isomerization in various degrees with all the catalysts mentioned. Thus propylene universally yields isopropyl derivatives in alkylation reactions. Although boron fluoride is predominantly a polymerization catalyst it has also been suggested for use in alkylation reactions. However, to employ this latter catalyst in alkylation reactions, high pressures have been considered essential together with promoting agents such as metallic nickel, water, phosphorous pentoxide and sulfuric acid.

The present invention has as an object the provision of a new and improved process for the alkylation of aromatic hydrocarbons in which process the addition compounds formed by the reaction of boron fluoride with aliphatic monohydric alcohols are employed to accelerate the reaction. Other objects will appear hereinafter.

The alkylation catalysts which we employ comprise the organic complex or addition compounds formed from the reaction of boron fluoride with monohydric aliphatic alcohols and containing from 1 to 2 mols of alcohol per mol of boron fluoride. Catalysts of this type do not require the presence of promoters and are active alkylation catalysts at moderate temperatures and at moderate pressures selected to conform to the reaction requirements. Since these catalysts are relatively stable liquids and are substantially hydrocarbon insoluble they can be used with mechanical agitation in batch operation or in continuous counter-current operation involving a catalyst recycle operation. Other advantages of said catalysts will be apparent from the examples cited.

We have discovered that the results obtained with alcohol-boron fluoride addition compounds in our process are far superior to those produced from the use of boron fluoride alone. Under the conditions employed in our process free boron fluoride has no measurable activity when employed with benzene and propylene. Free boron fluoride dissolved in benzene obviously then is not the active catalyst when the above addition compounds are employed as catalysts. This view is further substantiated in the observation that the first sign of loss of catalytic activity of our alcohol-boron fluoride catalyst is the appearance of boron fluoride fumes in the reflux condenser of the reaction vessel.

The alcohol-boron fluoride compounds employed as alkylation catalysts in our process may be conveniently prepared by saturating the selected alcohol, preferably anhydrous, with anhydrous boron fluoride. In most instances the reaction is completed with the absorption of one mol of boron fluoride per mol of alcohol. However in some cases, depending on the temperature of the reaction and the nature of the alcohol, compounds containing two mols of alcohol per mol of boron fluoride may be formed. We prefer to use the normal primary alcohols, although the iso, the secondary, or tertiary alcohols may be used. With alcohols containing four or more carbon atoms, and more especially with secondary and/or tertiary alcohols, side reactions may take place to produce oily polymers which are believed to be olefin polymers. Such polymers are removed in any suitable manner as by layer separation and/or distillation. Although such side reactions reduce the yield of catalyst somewhat, compounds of excellent and specific catalytic activity are obtained from such alcohols as explained hereinafter.

In the actual preparation of said catalysts gaseous boron fluoride is passed into a monohydric aliphatic alcohol while maintaining the reaction temperature below 100° F. and preferably between 75–95° F. A drop in reaction temperature and the appearance of free boron fluoride are indicative of completion of the reaction.

We have discovered that the alkylation of aromatic hydrocarbons can be carried out at near-atmospheric temperatures ordinarily not exceeding 100° F. or at most about 130° F., and at substantially atmospheric pressure by the introduction of an unsaturated aliphatic hydrocarbon into the said aromatic hydrocarbon in the presence of a catalyst such as an addition compound produced by the action of boron fluoride on monohydric aliphatic alcohols.

In batch operation the catalyst may be suspended in a suitable reaction medium containing the aromatic hydrocarbon to be alkylated such as benzene and the unsaturated hydrocarbon such as propylene introduced at such rate that substantially complete reaction thereof takes place. Low-boiling normally gaseous unsaturates may be introduced in vapor phase, while normally liquid materials may be added in either liquid or gaseous phase as desired at a carefully controlled rate so as to produce the desired concentration. If monoalkylated products are desired the addition of the unsaturated hydrocarbon is discontinued on the addition of an equimolecular proportion of the latter. Further addition of the unsaturated hydrocarbon leads to formation of increasing proportions of polyalkylated aromatics. At the conclusion of the reaction the spent catalyst is removed by gravity separation. The product may be washed free of entrained catalyst with water and the wet alkylate dried prior to fractional distillation to separate various components of the mixture.

In proceeding in accordance with the present invention, we may operate either in batchwise manner or continuously, preferably the latter. When employing a batchwise operation, the unsaturated alkylating hydrocarbon, which is in gaseous form in the case of C4 and lower, may be introduced intermittently or continuously at a rate equal to and preferably not exceeding that at which reaction takes place, into a vigorously agitated mixture of the liquid catalyst and the aromatic hydrocarbon to be alkylated, which is either in liquid form as in the case of benzene and toluene, or in solution in a suitable solvent or diluent as in the case solid aromatics such as para-xylene, naphthalene, anthracene, etc. Preferably, provision is made for venting off any unreacted components, mainly normally gaseous saturated hydrocarbons. After alkylation has proceeded to the desired extent, the reaction is discontinued, the reaction mixture allowed to form two layers, the liquid catalyst being the heavier, the aromatic phase separated, and the alkylated aromatic hydrocarbon recovered therefrom in any suitable manner.

When operating continuously, a convenient method is to establish countercurrent flow between the catalyst and the aromatic phase in a suitable reaction tower such as a vertical packed column. Two oppositely flowing liquid circuits may be established which overlap in the major portion of the tower to form the reaction zone in which the catalyst is descending and the aromatic phase in admixture with unreacted unsaturate and any alkylate ascending in intimate and extended countercurrent contact therewith. The catalyst leaving the bottom of the tower may be recycled to the top and sprayed into the top of the tower. Likewise the aromatic liquid phase leaving the top and preferably containing no unreacted alkylating agent may be recycled to the bottom after suitable cooling. Fresh alkylating agent may be introduced to the bottom of the tower either as such or in admixture with, or solution in, a suitable solvent or in the recycled aromatic phase. Fresh aromatic hydrocarbon may likewise be introduced at the proper rate to the bottom of the tower, usually in admixture with the recycled aromatic phase. Provision may desirably be made for venting off any gases reaching the top of the tower, mainly paraffins or other saturates in the alkylating agent supply, and for simultaneously keeping the pressure in the tower at substantially atmospheric. As soon as equilibrium is established a portion of the aromatic phase leaving the top may be drawn off, and not recycled, and passed to suitable purification and alkylate recovery steps, at a rate substantially equal to that at which fresh reaction materials are being fed in.

Instead of using a packed reaction column, the necessary intimate contact therein may be brought about by mechanical agitators of other suitable means.

The operation of our invention as a continuous process is illustrated in the accompanying figure where the alkylation of benzene with propylene is considered. The reaction chamber 8 is a vertical tower filled with a ceramic packing. The tower 8 is filled with benzene to the level indicated by the product take-off line 10. Propylene is pumped from storage tank 1 through line 2 and is introduced in the gaseous phase at the bottom of the tower. Benzene is pumped from tank 3 through line 4 and pump 5 along with recycled benzene and alkylate via line 7 into the bottom of the tower. The propylene and benzene flow upwardly and contact the catalyst flowing downward through the reaction tower 8. The catalyst is withdrawn through line 14. A portion of used catalyst is withdrawn via line 14A for reactivation and the remainder is recycled by means of pump 12 and line 13. Fresh make-up catalyst is continuously added from tank 25 through line 26. The hydrocarbon stream is withdrawn from the reaction tower through line 10. A major proportion of the product stream is recycled through line 11 and recycle pump 5 to the cooler 6. The cooled recycle product plus make-up benzene is then injected into the bottom of the tower via line 7. Substantially complete reaction of the propylene takes place, but accumulated impurities such as propane are vented through line 9.

The balance of the product stream passes via line 10A into a catalyst separator 15 where entrained catalyst is recovered by gravity separation and is introduced via line 16 into catalyst line 13. The product then passes into a washer 17 where last traces of catalyst are removed as by washing with an aqueous solution of alkali. The wet hydrocarbon mixture is dehydrated in 18 and the unreacted benzene is removed in stripping column 19. The recovered benzene is returned to storage 3 through line 20. The benzene-free product is finally fractionated in 21 to yield isopropyl benzene as the overhead product and polyalkylated benzenes as a kettle product.

While, in accordance with the present invention, the alkylation of aromatic hydrocarbons is catalyzed by the liquid addition compounds of boron fluoride with aliphatic monohydric alcohols, all of said addition compounds are not to be considered entirely equivalent in their catalytic properties. The choice of catalyst for a particular process may depend on the composition of the alkylate desired and on economic considerations such as the cost and yield of catalyst from a specific alcohol.

We have found that a catalyst such as methanol-boron fluoride catalyzes the alkylasodium hydroxide. After drying over solid sodium hydroxide 630 grams of the dried benzene-alkylate mixture was subjected to fractional distillation to yield 163 grams (185 cc.) of benzene and 450 grams of alkylate. Fractionation of the benzene-free alkylate gave 62 per cent of isopropylbenzene and 38 per cent of polyisopropylbenzenes.

Example II

Sixty grams of ethanol-boron fluoride catalyst was suspended in reagent grade benzene by means of mechanical agitation. Propylene gas of 95 per cent purity was introduced into the benzene catalyst mixture at an average rate of 95 cc. per minute until 84 grams (2 mols) of the olefin had been absorbed. The reaction was carried out at 80–85° F. under atmospheric pressure. On terminating the reaction 50 cc. of catalyst-hydrocarbon compound was recovered by gravity separation. After the usual treatment of the benzene phase to remove entrained catalyst, 175 grams of benzene-free alkylate was recovered, of which 51 per cent consisted of isopropyl-benzene.

Example III

The alkylation of benzene with propylene in this instance was catalyzed by an addition compound of boron fluoride with isopropyl alcohol. The catalyst was prepared by saturating isopropyl alcohol cooled in an ice bath with anhydrous boron fluoride. At the end of the reaction, essentially one mol of $BF_3$ had been absorbed per mol of alcohol. On standing overnight 31 per cent by weight of the original compound had separated as an oily polymer. The unpolymerized portion was used as the catalyst. Forty grams of catalyst was suspended by means of a mechanical stirrer in 220 grams of benzene. Propylene gas was introduced at an average rate of 94 cc. per minute until 95 grams (2.25 mols) had been absorbed. The reaction was carried out between temperature limits of 86–92° F. at atmospheric pressure. After termination of the reaction 30 grams of used catalyst was recovered by simple gravity separation. After the usual treatment for removal of entrained catalyst and unreacted benzene, 270 grams of alkylate was recovered of which 87 per cent was isopropylbenzene and the remainder polyisopropyl derivatives.

Example IV 47.5 grams of methanol-boron fluoride catalyst was suspended in 220 grams (2.8 mols) of benzene by means of mechanical agitation. Gaseous butene-2 was introduced into the above mixture at an average rate of 90 cc. per minute until 78 grams of olefin had been absorbed. The reaction temperature varied between 81–87° F. at atmospheric pressure. At the conclusion of the reaction about 45 grams of used catalyst was recovered. After the customary treatment, 165 grams of benzene-free alkylate was obtained. Fractional distillation of the alkylate resulted in a 73 per cent yield of sec-butylbenzene.

Example V

The alkylation of benzene with butene-2 in this instance was catalyzed by the addition compound prepared from sec-butyl alcohol and boron fluoride. In preparation of the catalyst one mol. of alcohol absorbed approximately one mol. of boron fluoride. On standing overnight at room temperature a clear viscous oil separated from the catalyst which amounted to about 40 per cent of the original weight. The non-oily layer was used to catalyze the following reaction.

The reaction in this case was carried out as described in previous examples with 29 grams of catalyst in 220 grams of benzene. The gaseous butene-2 was introduced at the rate of 90 cc. per minute until 86 grams had been absorbed. At the conclusion of the reaction, catalyst and unreacted benzene were removed from the alkylate to yield 140 grams of the latter. Fractional distillation of the alkylate resulted in an 87 per cent yield of sec-butylbenzene.

Example VI

In the alkylation of benzene with pentene-2, 42 grams of methanol-boron fluoride catalyst was suspended in 220 grams of benzene in the usual manner. Pentene-2 was introduced drop-wise at a rate of 60 cc. per hour until 300 cc. (2.8 mols) had been added. The reaction proceeded smoothly at temperatures between 90–100° F. and at atmospheric pressure. At the conclusion of the reaction 30 cc. of used catalyst was recovered after which entrained catalyst and unreacted benzene were removed from the crude alkylate. The benzene-free alkylate (310 grams) on fractional distillation gave a 68 per cent yield of 2-phenylpentane boiling between 188–191° C.

Example VII

Alkylation of naphthalene with propylene was accomplished by dissolving 43.5 grams (0.34 mols) of naphthalene in 250 cc. of cyclohexane and mechanically agitating this solution with 15 grams of methanol-boron fluoride catalyst during the introduction of gaseous propylene. The propylene was added at a rate of 90–92 cc. per minute while maintaining the reaction temperature between 85–90° F. at atmospheric pressure. One mol of propylene was introduced to yield 88 grams of a mixture of isopropyl naphthalenes.

Example VIII

The following procedure was employed in the alkylation of benzene with butadiene. To 250 cc. (220 grams) of benzene, 20 grams of methanol-boron fluoride catalyst was added and maintained in suspension by means of mechanical agitation. Butadiene was passed into the benzene catalyst mixture at an average rate of 86 cc. of gas per minute. The reaction was carried out at 88–91° F. at atmospheric pressure. A total of 84 grams (1.55 mols) of butadiene was introduced. On termination of the reaction the benzene-alkylate solution was processed as described in previous examples. Removal of unreacted benzene by distillation gave 190 grams of benzene-free alkylate. Fractionation of the alkylate resulted mainly in phenyl butenes boiling between 180–185° C.

Example IX

Alkylation of benzene with a fraction of cracking-still gases consisting essentially of $C_2$ and $C_3$ hydrocarbons including ethylene and propylene was accomplished under pressure in the presence of methanol-boron fluoride catalyst. The hydrocarbon gas mixture was charged at 50 pounds pressure to a one liter bomb containing 100 cc. of benzene and 5 grams of methanol-boron catalyst. The bomb was equipped with a rocking mechanism to effect distribution of the catalyst. The reaction was carried out at temperatures between 100–130° F. Frequent addition of gas and venting of unreactive paraffins was necessary during tion reactions of aromatic hydrocarbons with all the common unsaturated aliphatic hydrocarbons to give excellent yields of monoalkyl aromatics. We have also discovered that greatly increased yields of monoalkyl aromatic derivatives are obtained when the catalyst is prepared from an alcohol corresponding to the olefin employed, that is having the same number of carbon atoms which have the same structural configuration, or in other words, the alcohol which is formed upon hydration of the olefin, as with sulfuric acid. Thus, whereas the yield of mono-isopropyl benzene may amount to about 65 per cent of the total alkylate when the reaction between benzene and propylene is catalyzed by methanol-boron fluoride, a higher yield of about 85 per cent or more is realized when the catalyst is prepared from isopropyl alcohol. These yields are based on the benzene originally taken.

The alkylation reactions in the presence of the alcohol-boron fluoride catalyst may be carried out over a relatively wide range of temperatures and pressures, depending to a large extent on the aromatic compound to be alkylated and the source and nature of the alkylating agent. In order to control the rate of alkylation and increase the proportion of monoalkylated derivatives, temperatures are usually maintained at values within the range of from about −30° to about 130° F., with a somewhat narrower range of from about +30° to about 100° F. being preferred for a majority of the reactions.

The pressure used is preferably substantially atmospheric, but may be varied therefrom somewhat depending on the ease and rate of alkylation. In exceptional circumstances pressures materially above atmospheric may be used. For example, where the alkylating agent comprises mainly ethylene, pressures as high as 100 pounds per square inch may be used, especially in a batchwise operation, to maintain the desired concentration of the olefin in the reaction medium.

As the aromatic hydrocarbon, we prefer to use benzene and its homologues, although we may use poly-ring aromatics such as naphthalene, anthracene, phenanthrene and their homologues.

As the alkylating agent, we may use unsaturated aliphatic hydrocarbons such as either acyclic mono-olefins of from 2 to 10 carbon atoms such as ethylene and its homologues, acetylenes, such as acetylene itself, alicyclic mono-olefins and homologues thereof, such as cyclohexene, or diolefins such as acyclic diolefins such as butadiene and its homologues, alicyclic diolefins such as cyclopentadiene, cyclohexadiene, etc.

As indicated above, the reaction may be carried out with the liquid aromatic hydrocarbon serving as the reaction medium, since the concentration of the alkylating agent is ordinarily maintained at low values during alkylation. Or the aromatic hydrocarbon may be mixed with and/or dissolved in a suitable inert liquid diluent such as the paraffin or cycloparaffin hydrocarbons of 5 to 8 or more carbon atoms. This arrangement is of particular importance when operating at low temperatures in order to prevent crystallization of the aromatic compounds. Similarly, when alkylating normally solid aromatics, they may be dispersed and/or dissolved in inert liquid diluents and/or solvents such as aliphatic or cyclo-aliphatic hydrocarbons or the like.

The quantity of catalyst required to promote the alkylation of a given weight of aromatic hydrocarbon is dependent on the catalyst selected, ease of alkylation and the degree of dispersion of the catalyst in the hydrocarbon to be alkylated. In some instances one part by weight of catalyst in 30 or more parts by weight of aromatic hydrocarbon has been found to be effective whereas in some instances one part of catalyst per six parts of aromatic hydrocarbon has been necessary to produce the desired rate of reaction. Loss of activity of the catalyst is probably caused by the formation of hydrocarbon complex compounds. Since the catalytic agents of our process possess a low degree of solubility in hydrocarbons, recovery of the catalyst is conveniently effected by gravity separation with comparatively little loss. The activity of the used catalyst may ordinarily be restored through distillation under diminished pressure.

Satisfactory catalysts have been prepared from saturated aliphatic monohydric alcohols containing from 1 to 8 carbon atoms. The yield of catalyst is ordinarily best with the primary alcohols, and we often prefer to use primary alcohols having 1 to 4 carbon atoms because of the relative purity and availability of the alcohols in this group. However, as previously pointed out, secondary alcohols may produce a more specific catalyst for monoalkylate production. Examples of preferred alcohols are methyl, ethyl, propyl, isopropyl, n-butyl, sec-butyl and isobutyl. Other alcohols which may, though, less preferably, be used are tertiary butyl, the various amyl, hexyl, heptyl and octyl alcohols, etc.

We have found that aromatic hydrocarbons including benzene and its homologs as well as fused benzene ring compounds and their homologs can be successfully alkylated by our process. In general, aromatic hydrocarbons containing more than three alkyl substituents are not readily alkylated. The source of alkyl radicals are the aliphatic unsaturated hydrocarbons and more particularly the members of the olefifin and diolefin series. Cyclic non-aromatic unsaturates such as cyclohexene also may serve as a source of alkyl radicals. We have further found that by maintaining a very low concentration of the alkylating agent such as the olefin and/or diolefin, say for example below about 5% by volume of the aromatic phase, the alkylation reaction takes precedence over polymerization reactions to the extent of substantially preventing polymer formation.

We do not limit ourselves to any particular theory or mode of operation with any specific hydrocarbon or catalyst composition except as defined and limited by the scope of the present disclosure. Other details relating to the procedure and the advantages of our invention will be described in the following examples which are merely offered by way of illustration and without limiting the invention.

*Example I*

To 440 grams (5.6 mols) of reagent grade benzene, 77 grams (50 cc.) of methanol-boron fluoride catalyst was added and maintained in a fine state of dispersion by means of mechanical agitation. Propylene gas of 95 per cent purity was introduced into the benzene-catalyst mixture at an approximate rate of 90 cc. per minute. The temperature of the reaction was maintained between 80–90° F. at atmospheric pressure. On termination of the reaction, 60 grams of catalyst was recovered by gravity separation. Entrained and dissolved catalyst was removed from the crude reaction product by washing with dilute the course of the reaction. At the conclusion of the reaction 110 grams of alkylate was recovered which consisted of a mixture of alkylated benzenes with a small proportion of unreacted benzene.

We are aware that it has been heretofore proposed (Br. 453,422 and Fr. 799,016) to effect the alkylation of aromatic hydrocarbons with aliphatic mono-olefins in the presence of addition compounds of boron fluoride and alcohols at temperatures of at least 60° C. (140° F.) and at pressures of at least 5 atmospheres. Our process differs materially from such a process since we use low temperatures and almost invariably use substantially atmospheric pressure. Consequently our process is much more conveniently and economically carried out and produces much better results. In addition our process is much more readily and accurately controlled and we keep the concentration of the alkylating agent low in most cases. Moreover our preferred manipulative procedure of operation has not been heretofore proposed so far as we are aware.

As used herein the terms "alkylating" and "alkylation" are used in their broadest sense to cover introduction of both aliphatic and cycloaliphatic groups.

We claim:

1. A process for the alkylation of aromatic hydrocarbons with unsaturated aliphatic hydrocarbons which comprises reacting an aromatic hydrocarbon with an unsaturated aliphatic hydrocarbon in the presence of a catalyst comprising a liquid addition product of boron fluoride and an aliphatic monohydric alcohol, corresponding in number of carbon atoms and in molecular structure to said unsaturated aliphatic hydrocarbon, at a temperature not exceeding about 130° F.

2. A process for the production of a major proportion of monoalkylbenzene derivatives which comprises introducing under reaction conditions an olefin hydrocarbon into an intimate mixture of benzene and an alkylation catalyst consisting of an addition compound of boron fluoride with a monohydric alcohol corresponding in number of carbon atoms and in molecular structure to said olefin.

3. A process for the production of benzene derivatives, which comprises reacting benzene and an aliphatic unsaturated $C_4$ hydrocarbon at a temperature not greater than about 130° F., and with a substantial molar excess of benzene, in the presence of an addition compound resulting from reacting boron fluoride with a butyl alcohol having the same carbon atom structure as said $C_4$ hydrocarbon.

4. A process for the production of alkyl aromatic hydrocarbons, which comprises reacting a low-boiling aromatic hydrocarbon with a low-boiling olefin under alkylation conditions in the presence of a liquid addition compound resulting from reacting boron fluoride with not more than an equimolar amount of an aliphatic monohydric alcohol having the same number of carbon atoms per molecule and same carbon atom structure as said olefin.

5. A process for the production of an alkyl aromatic hydrocarbon, which comprises reacting a low-boiling alkylatable aromatic hydrocarbon with a low-boiling olefinic hydrocarbon under alkylation conditions and at a reaction temperature not exceeding about 130° F. in the presence of a liquid addition compound resulting from reacting boron fluoride with not more than an equimolar amount of a monohydric alcohol having the same number of carbon atoms per molecule and the same carbon atom structure as said olefinic hydrocarbon.

6. A process for the production of phenyl butene, which comprises reacting benzene and butadiene at a temperature not greater than about 130° F., and with a substantial molar excess of benzene, in the presence of an addition compound resulting from reacting boron fluoride with a normal butyl alcohol.

7. A process for the production of isopropyl benzene, which comprises reacting benzene with propylene in the presence of a catalyst, comprising a liquid addition product of boron fluoride and a propyl alcohol, at a reaction temperature not exceeding about 130° F.

8. A process for the production of ethyl benzene, which comprises reacting benzene with ethylene in the presence of a catalyst, comprising a liquid addition product of boron fluoride and ethyl alcohol, at a reaction temperature not exceeding about 130° F.

WALTER A. SCHULZE.
WILLIAM N. AXE.

REFERENCES CITED

The following references are of record in the file of this patent:

UNITED STATES PATENTS

| Number | Name | Date |
|---|---|---|
| 2,222,012 | Amos et al. | Nov. 19, 1940 |
| 2,244,556 | Holm et al. | June 3, 1941 |
| 2,267,097 | Hatch et al. | Dec. 23, 1941 |

FOREIGN PATENTS

| Number | Country | Date |
|---|---|---|
| 453,422 | Great Britain | Sept. 4, 1936 |
| 799,016 | France | Mar. 23, 1936 |
| 337,181 | Italy | Feb. 27, 1936 |